(12) United States Patent
Igarashi et al.

(10) Patent No.: US 11,731,701 B2
(45) Date of Patent: *Aug. 22, 2023

(54) AUTONOMOUS DRIVING SYSTEM

(71) Applicant: TOYOTA JIDOSHA KABUSHIKI KAISHA, Toyota (JP)

(72) Inventors: Ko Igarashi, Susono (JP); Atsuki Kinoshita, Mishima (JP); Yuki Mori, Mishima (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/089,781

(22) Filed: Dec. 28, 2022

(65) Prior Publication Data

US 2023/0133757 A1    May 4, 2023

Related U.S. Application Data

(63) Continuation of application No. 16/458,254, filed on Jul. 1, 2019, now Pat. No. 11,628,881.

(30) Foreign Application Priority Data

Aug. 1, 2018    (JP) .................................. 2018-145110

(51) Int. Cl.
*B62D 15/02* (2006.01)
*G05D 1/00* (2006.01)
(Continued)

(52) U.S. Cl.
CPC ........... *B62D 15/0255* (2013.01); *B62D 1/02* (2013.01); *B62D 6/00* (2013.01); *G05D 1/0088* (2013.01); *G05D 2201/0213* (2013.01)

(58) Field of Classification Search
CPC ........... B60R 2300/804; B60T 2201/08; B60T 2201/085; B60T 2201/087; B60T 8/17557;
(Continued)

(56) References Cited

U.S. PATENT DOCUMENTS 5,765,116 A    6/1998    Wilson-Jones et al.
9,796,416 B2   10/2017   Fujii et al.
(Continued)

FOREIGN PATENT DOCUMENTS

JP    07-104850 A     4/1995
JP    2001-048034 A   2/2001
(Continued)

OTHER PUBLICATIONS

Notice of Allowance dated Feb. 9, 2023 issued by the U.S. Appl. No. 16/458,254.
(Continued)

*Primary Examiner* — Christian Chace
*Assistant Examiner* — Jordan S Fei
(74) *Attorney, Agent, or Firm* — Sughrue Mion, PLLC (57) ABSTRACT

An autonomous driving system configured to perform an autonomous driving of a vehicle includes a lane change determination unit configured to determine a necessity of an operation intervention for a lane change of the vehicle by a driver of the vehicle during the autonomous driving, a lane change request unit configured to request the driver to perform the operation intervention for the lane change of the vehicle when the lane change determination unit determines that it is necessary to perform the operation intervention for the lane change of the vehicle by the driver, and a mode switching unit configured to switch a steering torque mode for a lane keep control in the autonomous driving from a normal steering torque mode to a weak steering torque mode
(Continued)

when the driver is requested to perform the operation intervention for the lane change of the vehicle.

2 Claims, 4 Drawing Sheets

(51) Int. Cl.
  *B62D 6/00* (2006.01)
  *B62D 1/02* (2006.01)
(58) Field of Classification Search
  CPC ...... B60W 10/04; B60W 10/18; B60W 10/20;
    B60W 2050/007; B60W 2050/0071;
    B60W 2050/0072; B60W 2050/0073;
    B60W 2050/0074; B60W 2050/0091;
    B60W 2050/143; B60W 2050/146; B60W
    2420/42; B60W 2420/52; B60W 2540/10;
    B60W 2540/12; B60W 2540/18; B60W
    2552/05; B60W 2552/20; B60W 2552/53;
    B60W 2554/00; B60W 2554/4045; B60W
    2554/801; B60W 2556/00; B60W
    2556/50; B60W 2710/202; B60W 30/10;
    B60W 30/12; B60W 30/14; B60W
    30/18154; B60W 30/18163; B60W 50/08;
    B60W 50/082; B60W 50/085; B60W
    50/087; B60W 50/10; B60W 50/12;
    B60W 50/14; B60W 50/16; B60W
    60/0053; B60W 60/0055; B60Y 2300/10;
    B60Y 2300/12; B60Y 2300/14; B62D
    1/02; B62D 1/286; B62D 15/025; B62D
    15/0255; B62D 6/00; B62D 6/007; E01F
    9/576; E01F 9/582; E01F 9/588; G01C
    21/3658; G05D 1/0061; G05D 1/0088;
    G05D 2201/0213; G06T 2207/30256;
    G06V 20/588; G08G 1/167
  See application file for complete search history.

(56) References Cited

U.S. PATENT DOCUMENTS

| | | | |
|---|---|---|---|
| 10,222,796 | B2 | 3/2019 | Ichikawa et al. |
| 10,308,254 | B2 | 6/2019 | Hirano et al. |
| 10,310,508 | B2 | 6/2019 | Kunisa et al. |
| 10,579,056 | B2 | 3/2020 | Matsumura |
| 10,649,452 | B2 | 5/2020 | Ichikawa et al. |
| 10,654,482 | B2 | 5/2020 | Urano et al. |
| 10,895,875 | B2 | 1/2021 | Hashimoto et al. |
| 11,260,868 | B2 | 3/2022 | Urano et al. |
| 11,327,485 | B2 | 5/2022 | Sato et al. |
| 2014/0032047 | A1 | 1/2014 | Voelz |
| 2016/0176400 | A1 | 6/2016 | Nakano et al. |
| 2016/0280236 | A1 | 9/2016 | Otsuka |
| 2018/0162396 | A1 | 6/2018 | Ibuka et al. |
| 2018/0370527 | A1 | 12/2018 | Rachor |
| 2019/0283770 | A1 | 9/2019 | Kubota et al. |
| 2020/0039584 | A1 | 2/2020 | Igarashi et al. |
| 2020/0110422 | A1 | 4/2020 | Takamatsu et al. |

FOREIGN PATENT DOCUMENTS

| | | |
|---|---|---|
| JP | 3622329 A | 2/2005 |
| JP | 2010036852 A | 2/2010 |
| JP | 2018-94960 A | 6/2018 |

OTHER PUBLICATIONS

Non-Final Office Action dated Jun. 21, 2021 in U.S. Appl. No. 16/458,254.
Final Office Action dated Jan. 6, 2022 in U.S. Appl. No. 16/458,254.
Advisory Action dated May 2, 2022 in U.S. Appl. No. 16/458,254.
Non-Final Office Action dated Jul. 26, 2022 in U.S. Appl. No. 16/458,254.

Fig.1

AUTONOMOUS DRIVING SYSTEM

CROSS-REFERENCE TO RELATED APPLICATION

This application is a continuation of U.S. application Ser. No. 16/458,254 filed Jul. 1, 2019, which claims the benefit of priority from Japanese Patent Application No. 2018-145110 filed Aug. 1, 2018, the entire contents of which are incorporated herein by reference.

TECHNICAL FIELD

The present disclosure relates to an autonomous driving system.

BACKGROUND

In the related art, Japanese Patent No. 3622329 is known as a technical literature relating to an autonomous driving system. This publication discloses a vehicle steering device that sets an autonomous steering mode when an output of a torque sensor by a driver is lower than a predetermined threshold value, and sets a power steering mode when the output from the torque sensor is equal to or higher than the predetermined threshold value. When the power steering mode is set, a steering force from the driver is strengthened or suppressed according to the travel state of a host vehicle.

SUMMARY

Incidentally, a vehicle control in which a lane change of the vehicle is autonomously performed is known as one of the autonomous driving of the vehicle. However, when road conditions are complicated or when a distance is not sufficient for the autonomous lane change, the driver may need to perform the lane change even during the autonomous driving. On the other hand, even if the system requests the driver to perform the lane change operation during the autonomous driving, it is necessary to preserve the steering torque in order for a lane keep control based on an assumption that the driver does not appropriately steer. In such a case, it is required to appropriately adjust the steering torque with respect to the steering by the driver.

Therefore, in the present technical field, it is desired to provide an autonomous driving system capable of appropriately adjusting the steering torque with respect to the operation intervention by the driver for the lane change during the autonomous driving.

According to an aspect of the present disclosure, there is provided an autonomous driving system configured to perform an autonomous driving of a vehicle, the system includes a lane change determination unit configured to determine a necessity of an operation intervention for a lane change of the vehicle by a driver of the vehicle during the autonomous driving, a lane change request unit configured to request the driver to perform the operation intervention for the lane change of the vehicle when the lane change determination unit determines that it is necessary to perform the operation intervention for the lane change of the vehicle by the driver, and a mode switching unit configured to switch a steering torque mode for a lane keep control in the autonomous driving from a normal steering torque mode to a weak steering torque mode when the driver is requested to perform the operation intervention for the lane change of the vehicle.

According to the autonomous driving system in the aspect of the present disclosure, if it is determine that it is necessary for the driver to perform the operation intervention for the lane change of the vehicle, the driver is requested to perform the operation intervention for the lane change of the vehicle and the steering torque mode for the lane keep in the control autonomous driving is switched to the weak steering torque mode from the normal steering torque mode. Therefore, in the autonomous driving system, if it is determined that it is necessary for the driver to perform the operation intervention for the lane change, since the steering torque for the lane keep control is switched to the weak steering torque mode, it becomes easy for the driver to perform the lane change of the vehicle compared to a case when the steering torque for the lane keep control is maintained as the normal steering torque mode. Therefore, it is possible to appropriately adjust the steering torque for the lane keep control with respect to the operation intervention by the driver for the lane change.

In the autonomous driving system in the aspect of the present disclosure, the weak steering torque mode may be a mode that weakens, compared to that in the normal steering torque mode, the steering torque of the lane keep control in the direction of the lane change of the vehicle among the right direction and the left direction of the vehicle, and does not change the steering torque of the lane keep control in the direction opposite to the direction of lane change of the vehicle.

In the autonomous driving system in the aspect of the present disclosure, the system may be configured to further include an area switching unit configured to switch an area between an ignorance area where the vehicle is caused to travel by the control of the autonomous driving even if there is an operation intervention by the driver, a cooperation area where the vehicle is caused to travel under a cooperation between the operation intervention by the driver and the control of the autonomous driving, and a cut-off area where the vehicle is caused to travel by the operation intervention by the driver without reflecting the control of the autonomous driving according the amount of operation intervention by the driver during the autonomous driving. The area switching unit may be configured to switch the area to the cooperation area if the amount of operation intervention by the driver becomes equal to or greater than a first threshold value, and to switch the area to the cut-off area if the amount of operation intervention by the driver is equal to or greater than the second threshold value which is greater than the first threshold value. The first threshold value and a second threshold value are switched to smaller values in the weak steering torque mode than that in the normal steering torque mode.

According to an aspect of the present disclosure, when the operation intervention by the driver for the lane change of the vehicle is required during the autonomous driving, it is possible to appropriately adjust the steering torque for the lane keep control with respect to the operation intervention by the driver for the lane change.

DETAILED DESCRIPTION

Hereinafter, embodiments of the present disclosure will be described with reference to the drawings.

Figure 1:
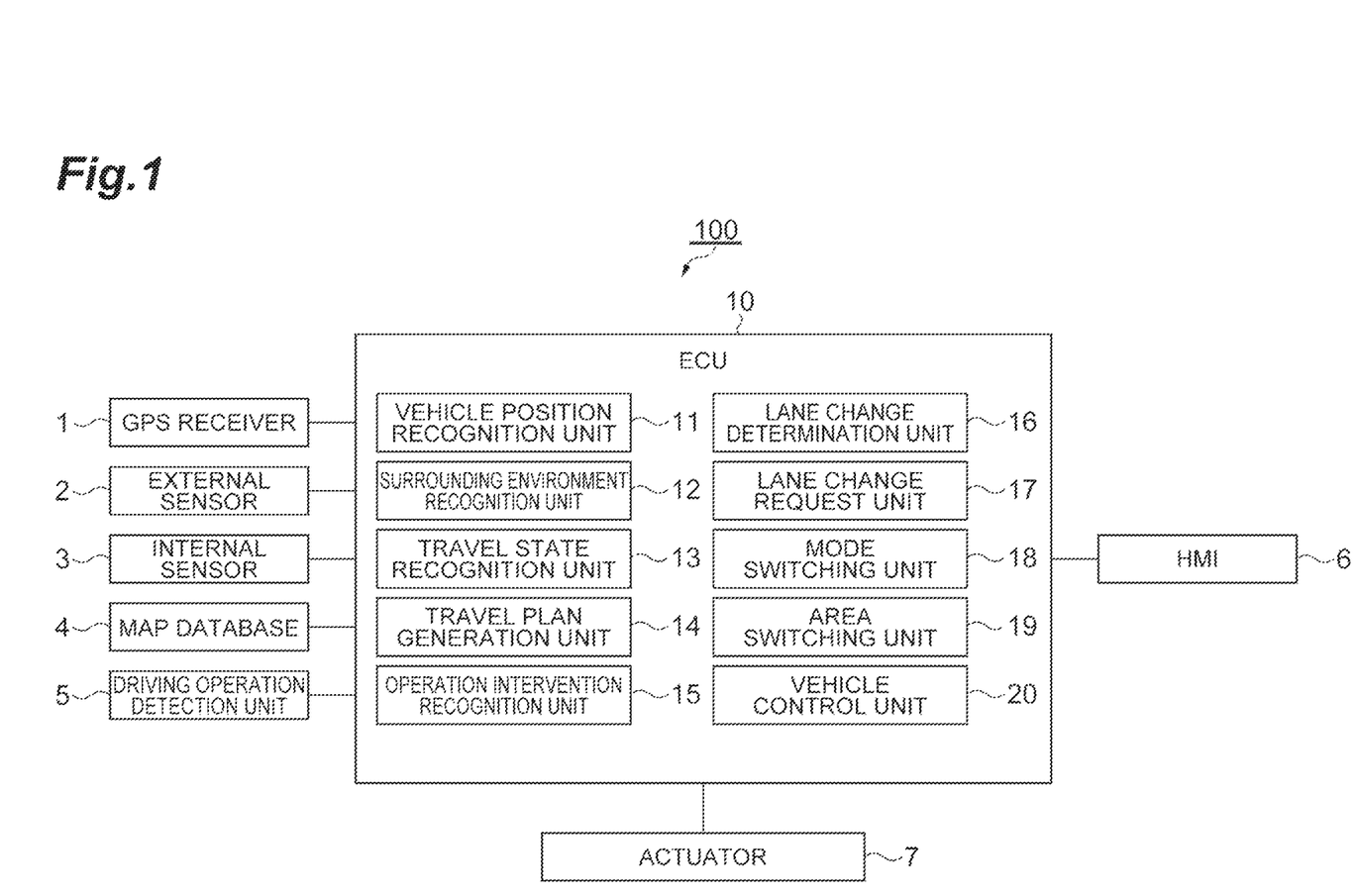
FIG. 1 is a block diagram illustrating an autonomous driving system according to one embodiment.

FIG. 1 is a block diagram illustrating an autonomous driving system according to an embodiment. An autonomous driving system 100 illustrated in FIG. 1 is mounted on a vehicle such as a passenger car, and performs an autonomous driving of the vehicle. The autonomous driving is a vehicle control that causes the vehicle to autonomously travel toward a destination set in advance. In the autonomous driving, the driver does not perform a driving operation, and the vehicle can travel autonomously.

In the autonomous driving in the present embodiment, a lane keep control is performed to suppress a deviation of the vehicle from a traveling lane. In the lane keep control, when the vehicle approaches the right and left lane marking lines of the traveling lane, a steering torque is given to a steering portion of the vehicle such that the vehicle returns to the center of the traveling lane. A well-known technology can be adopted for the lane keep control.

Configuration of Autonomous Driving System

The autonomous driving system 100 includes an electronic control unit (ECU) 10 that performs overall management of the system. The ECU 10 is an electronic control unit including a central processing unit (CPU), read only memory (ROM), random access memory (RAM), and the like. In the ECU 10, for example, various functions are realized by loading a program stored in the ROM into the RAM and executing the program loaded in the RAM by the CPU. The ECU 10 may be configured with a plurality of electronic units.

The ECU 10 is connected to a GPS receiver 1, an external sensor 2, an internal sensor 3, a map database 4, driving operation detection unit 5, a human machine interface (HMI) 6, and an actuator 7.

The GPS receiver 1 measures a position of the vehicle (for example, the latitude and longitude of the vehicle) by receiving signals from three or more GPS satellites. The GPS receiver 1 transmits information on the measured position of the vehicle to the ECU 10.

The external sensor 2 is a detection device that detects a surrounding situation of the vehicle. The external sensor 2 includes at least one of a camera and a radar sensor.

The camera is an imaging device that images an external situation of the vehicle. The camera is provided on the inside of a windshield of the vehicle. The camera transmits the imaging information relating to the external situation of the vehicle to the ECU 10. The camera may be a monocular camera or may be a stereo camera.

The radar sensor is a detection device that detects objects around the vehicle using radio waves (for example, millimeter waves) or light. The radar sensor includes, for example, at least one of the millimeter wave radar or a light detection and ranging (LIDAR). The radar sensor transmits the radio wave or light to the surroundings of the vehicle, and detects the objects by receiving radio waves or light reflected from the objects. The radar sensor transmits the detected object information to the ECU 10. The objects include fixed objects such as guard rails and buildings, as well as moving objects such as pedestrians, bicycles, and other vehicles.

The internal sensor 3 is a detection device that detects a traveling state of the vehicle. The internal sensor 3 includes a vehicle speed sensor, an accelerator sensor, and a yaw rate sensor. The vehicle speed sensor is a measuring device that measures a speed of the vehicle. As the vehicle speed sensor, for example, a vehicle wheel speed sensor is used, which is provided on vehicle wheels of the vehicle or on a drive shaft rotating integrally with vehicle wheels, and measures a rotational speed of the vehicle wheels. The vehicle speed sensor transmits the measured vehicle speed information to the ECU 10.

The accelerator sensor is a measuring device that measures an acceleration of the vehicle. The accelerator sensor includes, for example, a longitudinal accelerator sensor that measures acceleration in the longitudinal direction of the vehicle and a lateral accelerator sensor that measures a lateral acceleration of the vehicle. The accelerator sensor, for example, transmits the acceleration information of the vehicle to the ECU 10. The yaw rate sensor is a measuring device that measures a yaw rate (rotation angular velocity) around the vertical axis at the center of gravity of the vehicle. As the yaw rate sensor, for example, a Gyro sensor can be used. The yaw rate sensor transmits the measured yaw rate information of the vehicle to the ECU 10.

The map database 4 is a database that stores map information. The map database 4 is formed, for example, in a hard disk drive (HDD) mounted on the vehicle. The map information includes position information on a lane, information on a shape of the lane (for example, a curve, a lane width, or the like), position information on a stop line, information on positions of a merge point and a branch, and information on a position of buildings. The map information may also include speed related information such as a legal speed associated with the position or section on the map. The map information includes position information of marking objects such as utility poles used for vehicle position recognition. The map database 4 may be stored in a server such as a management center that can communicate with the vehicle.

The driving operation detection unit 5 detects a driving operation of the operation portion of the vehicle by the driver. The driving operation detection unit 5 includes, for example, a steering sensor, an accelerator sensor, and a brake sensor. The operation portion of the vehicle is a device that the driver inputs an operation for driving the vehicle.

The operation portion of the vehicle includes at least one of a steering portion of the vehicle, an accelerator operation portion of the vehicle, and a brake operation portion of the vehicle. The steering portion is, for example, a steering wheel. The steering portion is not limited to a form of wheel, but may be any configuration as long as the portion performs a steering function. The accelerator operation portion is, for example, an accelerator pedal. The brake operation portion is, for example, a brake pedal. The accelerator operation portion and the brake operation portion do not necessarily need to be a pedal, and any configuration may be used as long as acceleration or deceleration can be input by the driver.

The steering sensor measures an amount of operation of the steering portion by the driver. The amount of operation of the steering portion includes at least a steering torque or a steering angle. The accelerator sensor measures an amount of operation of the accelerator operation portion by driver. The amount of operation of the accelerator operation portion includes, for example, a depression amount of the accelerator pedal. The brake sensor measures an amount of operation of the brake operation portion by the driver. The amount of operation of the brake operation portion includes, for example, a depression amount of the brake pedal. A depression speed may be included in the amount of operation of the accelerator operation portion and the brake operation portion. The driving operation detection unit 5 transmits the operation amount information relating to the measured amount of operation by the driver to the ECU 10.

The HMI 6 is a device that performs inputting and outputting of the information between the autonomous driving system 100 and occupants. The HMI 6 is includes an input portion such as a touch panel for inputting the operation by the occupant, a display for outputting an image, a speaker for outputting a sound, and the like. The HMI 6 outputs the image on the display and outputs the sound from the speaker according to a control signal from the ECU 10. The HMI 6 may include a head-up display for projecting and displaying the windshield of the vehicle or the like.

The actuator 7 is a device used for controlling the vehicle. The actuator 7 includes at least a drive actuator, a brake actuator and a steering actuator. The throttle actuator controls a driving force of the vehicle by controlling an amount of air (throttle opening degree) supplied to the engine according to the control signal from the ECU 10. If the vehicle is a hybrid vehicle, in addition to the amount of air supplied to the engine, the control signal from the ECU 10 is input to a motor as a power source, and the driving force of the vehicle is controlled. If the vehicle is an electric vehicle, the control signal from the ECU 10 is input to a motor as a power source, and the driving force of the vehicle is controlled. The motor as the power source in these cases configures the actuator 7.

The brake actuator controls the brake system according to the control signal from the ECU 10 and controls a braking force applied to the wheels of the vehicle. For example, a hydraulic brake system can be used as the brake system. The steering actuator controls the driving of an assist motor controlling a steering torque of an electric power steering system according to the control signal from the ECU 10. As a result, the steering actuator controls the steering torque of the vehicle.

Next, a functional configuration of the ECU 10 will be described. The ECU 10 includes a vehicle position recognition unit 11, a surrounding environment recognition unit 12, a travel state recognition unit 13, a travel plan generation unit 14, an operation intervention recognition unit 15, a lane change determination unit 16, a lane change request unit 17, a mode switching unit 18, an area switching unit 19 and a vehicle control unit 20. A part of the functions of the ECU 10 described above may be performed by a server capable of communicating with the vehicle.

The vehicle position recognition unit 11 recognizes a position of the vehicle on the map based on the position information from the GPS receiver 1 and the map information in the map database 4. In addition, the vehicle position recognition unit 11 recognizes position information of the marking object included in the map information in the map database 4 and performs the vehicle position recognition with high accuracy using the result of detection performed by the external sensor 2 using the simultaneous localization and mapping (SLAM) technology. The vehicle position recognition unit 11 may recognize the position of the vehicle on the map using a known method.

The surrounding environment recognition unit 12 recognizes the surrounding environment of the vehicle based on the result of detection (the object information by the radar sensor and/or the imaging information by the camera) performed by the external sensor 2. The surrounding environment includes a situation of objects around the vehicle. The situation of the object is, for example, a relative position and a relative speed of the object relative to the vehicle. The surrounding environment may include recognition results of lane lines (a lane boundary line, a center line, and the like) around the vehicle. The surrounding environment recognition unit 12 recognizes the relative position of the lane line relative to the vehicle by well-known white line recognition based on the result of detection of the external sensor 2.

The travel state recognition unit 13 recognizes the travel state of the traveling vehicle based on the result of measurement performed by the internal sensor 3. The travel state includes the speed of the vehicle, the acceleration of the vehicle, and the yaw rate of the vehicle. Specifically, the travel state recognition unit 13 recognizes the speed of the vehicle based on the vehicle speed information from the vehicle speed sensor. The travel state recognition unit 13 recognizes the acceleration (a longitudinal acceleration and a lateral acceleration) of the vehicle based on the vehicle speed information from the accelerator sensor. The travel state recognition unit 13 recognizes the direction of the vehicle based on the yaw rate information from the yaw rate sensor.

The travel plan generation unit 14 generates a travel plan for the control of the autonomous driving based on a target route set in advance, the map information in the map database 4, the position of the vehicle on the map recognized by the vehicle position recognition unit 11, the surrounding environment of the vehicle recognized by the surrounding environment recognition unit 12, and the travel state of the vehicle recognized by the travel state recognition unit 13. The target route is set based on the destination set by the driver or the autonomous driving system 100, the map information, and the position of the vehicle on the map. The target route may be set by a well-known navigation system.

The travel plan includes a steering plan relating to the steering of the vehicle and a vehicle speed plan relating to the speed of the vehicle. The steering plan includes a target steering angle according to the position on the route on which the vehicle travels by the autonomous driving control. The position on the route is a position of the route (that is, the target route of autonomous driving control) on the map in the extending direction. Specifically, the position on the route can be a set vertical position set at a predetermined interval (for example, 1 m) in the extending direction of the route. The target steering angle is a control target value of the steering angle of the vehicle in the travel plan. The travel plan generation unit 14 generates the steering plan by setting a target steering angle for each position separated by a predetermined distance on the route. Instead of the target steering angle, the target steering torque or a target lateral position (a target position of the vehicle in the width direction of the road) may be used.

The vehicle speed plan includes a target vehicle speed corresponding to the position on the route on which the vehicle travels by the autonomous driving control. The target vehicle speed is a control target value of the vehicle speed in the travel plan. The travel plan generation unit 14 generates the vehicle speed plan by setting the target vehicle speed for each position separated by a predetermined interval on the route. Instead of the target vehicle speed, a target acceleration or a target jerk may be used. A time may be used as a reference instead of the position on the route (set vertical position). The travel plan in the autonomous driving is not limited to the content described above.

The operation intervention recognition unit 15 recognizes an amount of operation intervention by the driver during the autonomous driving of the vehicle. The operation intervention recognition unit 15 recognizes the operation intervention by the driver based on the driving operation detected by the driving operation detection unit 5. The operation intervention by the driver is to temporarily reflect the driving operation by the driver on the traveling of the vehicle without canceling the autonomous driving. When the operation intervention by the driver ends, the driving returns to the original autonomous driving. The amount of operation intervention is an amount of operation by the driver in the operation intervention during autonomous driving (an amount of steering, an amount of accelerator operation, and an amount of brake operation). The operation intervention recognition unit 15 recognizes at least the amount of steering by the driver as the amount of operation intervention.

The lane change determination unit 16 determines a necessity of operation intervention for the lane change of the vehicle by the driver of the vehicle. When the lane change of the vehicle by the autonomous driving cannot be performed due to an operational design domain (ODD) or the like, the autonomous driving system 100 requests the driver to perform the lane change of the vehicle. The lane change determination unit 16 determines the necessity of operation intervention for the lane change of the vehicle by the driver based on, for example, the target route of the vehicle (or the travel plan), the position of the vehicle on the map, and the map information.

Specifically, the lane change determination unit 16 determines that it is necessary for the driver to perform the operation intervention for the lane change of the vehicle when a length of a lane changeable section for the vehicle is shorter than a distance sufficient for the lane change by the autonomous driving. The lane changeable section for the vehicle is assumed to be a section where the traveling lane of the vehicle and the lane of a lane change destination are adjacent to each other. The distance sufficient for the lane change by the autonomous driving is a distance set in advance by the operational design domain or the like. The distance sufficient for the lane change by the autonomous driving may be changed according to the vehicle speed of the vehicle.

For example, on an elevated highway in which each lane is provided independently, if the lane changeable section for the vehicle where the traveling lane of the vehicle and the lane of the lane change destination partially travels in parallel is short, and thus, the length of the section is shorter than the distance sufficient for the lane change by the autonomous driving, the lane change determination unit 16 determines that it is necessary for the driver to perform the operation intervention for the lane change of the vehicle.

When the lane change of the vehicle to an adjacent lane is required for connecting the vehicle from the traveling lane to the branch road in order to enter a branch road along the target route, and when the distance from the vehicle to an entrance of the branch road (the distance in the lane extending direction) is shorter than the distance sufficient for the lane change by the autonomous driving, the lane change determination unit 16 may determine that it is necessary for the driver to perform the operation intervention for the lane change of the vehicle.

The lane change determination unit 16 may determine the necessity of operation intervention for the lane change of the vehicle by the driver based on the target route of the vehicle, the position of the vehicle on the map, and the surrounding environment of the vehicle. The target route of the vehicle can be replaced by the travel plan. For example, if the lane change of the vehicle is required in order to travel along the target route, and when the number of other vehicles traveling around the vehicle (for example, a certain distance from the vehicle) is greater than a lane change applicable number set in advance by the operational design domain, the lane change determination unit 16 may determine that it is necessary for the driver to perform the operation intervention for the lane change of the vehicle. The number of other vehicles may be counted by distinguishing the vehicles between the number of four-wheeled vehicles and the number of two-wheeled vehicles. In addition, instead of the number of other vehicles, the number of pedestrians may be counted.

If it is determined by the lane change determination unit 16 that it is necessary for the driver to perform the operation intervention for the lane change of the vehicle, the lane change request unit 17 requests the driver to perform the operation intervention for the lane change of the vehicle. The lane change request unit 17 requests the driver to perform the operation intervention for the lane change of the vehicle by transmitting the control signal to the HMI 6.

The lane change request unit 17 makes the request to the driver, for example, by the sound output from the speaker in the vehicle. The lane change request unit 17 may make the request to the driver by outputting an image on the display in the vehicle. In addition to the sound output and/or the image output, the lane change request unit 17 may make the request to the driver by the vibration of the steering wheel or the driver's seat of the vehicle.

When the operation intervention for the lane change of the vehicle is requested to the driver by the lane change request unit 17, the mode switching unit 18 switches a steering torque mode for the lane keep control in the autonomous driving from a normal steering torque mode to a weak steering torque mode. The lane keep control is not canceled even if the operation intervention for the lane change of the vehicle is requested to the driver. The lane keep control gives a steering torque to make reaction force to the steering torque by the driver trying to perform the lane change of the vehicle by the operation intervention in response to the request.

The normal steering torque mode is a mode performed during the normal lane keep control in the autonomous driving. In normal steering torque mode, when the vehicle approaches the lane marking lines on the right and left side of the traveling lane, the steering torque set in advance in the lane keep control is given to the steering portion of the vehicle. In the lane keep control, the steering torque is given such that the vehicle returns to the center of the traveling lane.

The weak steering torque mode is a mode that weakens the steering torque, compared to that in the normal steering torque mode, for the lane keep control in the direction of lane change of the vehicle out of the right and left direction of vehicle. And The weak steering torque mode does not change the steering torque for the lane keep control in the direction opposite to the direction of the lane change of the vehicle. In the weak steering torque mode, at least the steering torque in the direction of lane change of the vehicle is weaker than that in the normal steering torque mode.

If the lane change of the vehicle is completed by the operation intervention by the driver without the cancellation of the autonomous driving, the mode switching unit 18 returns the steering torque mode for the lane keep control to the normal steering torque mode. The completion of lane change of the vehicle can be recognized by detecting that the vehicle has crossed the lane marking lines, for example, based on the surrounding environment of the vehicle (the imaging information from the camera, and the like).

The area switching unit 19 switches an area for the autonomous driving according to the amount of operation intervention by the driver during the autonomous driving. The area switching unit 19 switches the area between an ignorance area, a cooperation area and a cut-off area according to the amount of operation intervention by the driver. The ignorance area is an area where the vehicle is caused to travel by the control of the autonomous driving even if there is an operation intervention by the driver. A case when the driver does not perform any operation intervention is also the ignorance area.

The cooperation area is an area where the vehicle is caused to travel under a cooperation between the operation intervention by the driver and the control of the autonomous driving. In the cooperation area, the amount of operation intervention by the driver is not reflected in the traveling of the vehicle as it is, but reflected in the traveling of the vehicle after adjusting and assisting the amount of operation intervention so as to follow the travel plan in the autonomous driving. A well-known technology can be adopted as the cooperation between the operation intervention by the driver and the control of the autonomous driving in the cooperation area.

The cut-off area is an area where the vehicle is caused to travel by the operation intervention by the driver without reflecting the control of the autonomous driving. In the cut-off area, the amount of operation intervention by the driver is directly reflected in the traveling of the vehicle. By switching the area to the cut-off area, the autonomous driving is not canceled, and the generation of the travel plan is continued in the background even in the cut-off area.

The area switching unit 19 switches the area to the cooperation area when the amount of operation intervention by the driver becomes equal to or greater than a first threshold value. In addition, the area switching unit 19 switches the area to the cut-off area when the amount of operation intervention by the driver becomes equal to or greater than a second threshold value.

The first threshold value is a value set in advance. The second threshold value is a value set in advance, and is greater than the first threshold value. When the steering torque mode for the lane keep control is the weak steering torque mode, the first threshold value and the second threshold value are switched to values smaller than that in the normal steering torque mode. The amount of operation intervention by the driver is, as an example, the amount of operation (the steering torque or the steering angle) of the steering portion by the driver. The amount of operation intervention by the driver may include an amount of operation of the accelerator operation portion and/or an amount of operation of the brake operation portion. In this case, appropriate values are set for the first threshold value and the second threshold value for the amount of operation of the accelerator operation portion and the amount of operation of the brake operation portion, respectively.

Figure 2:
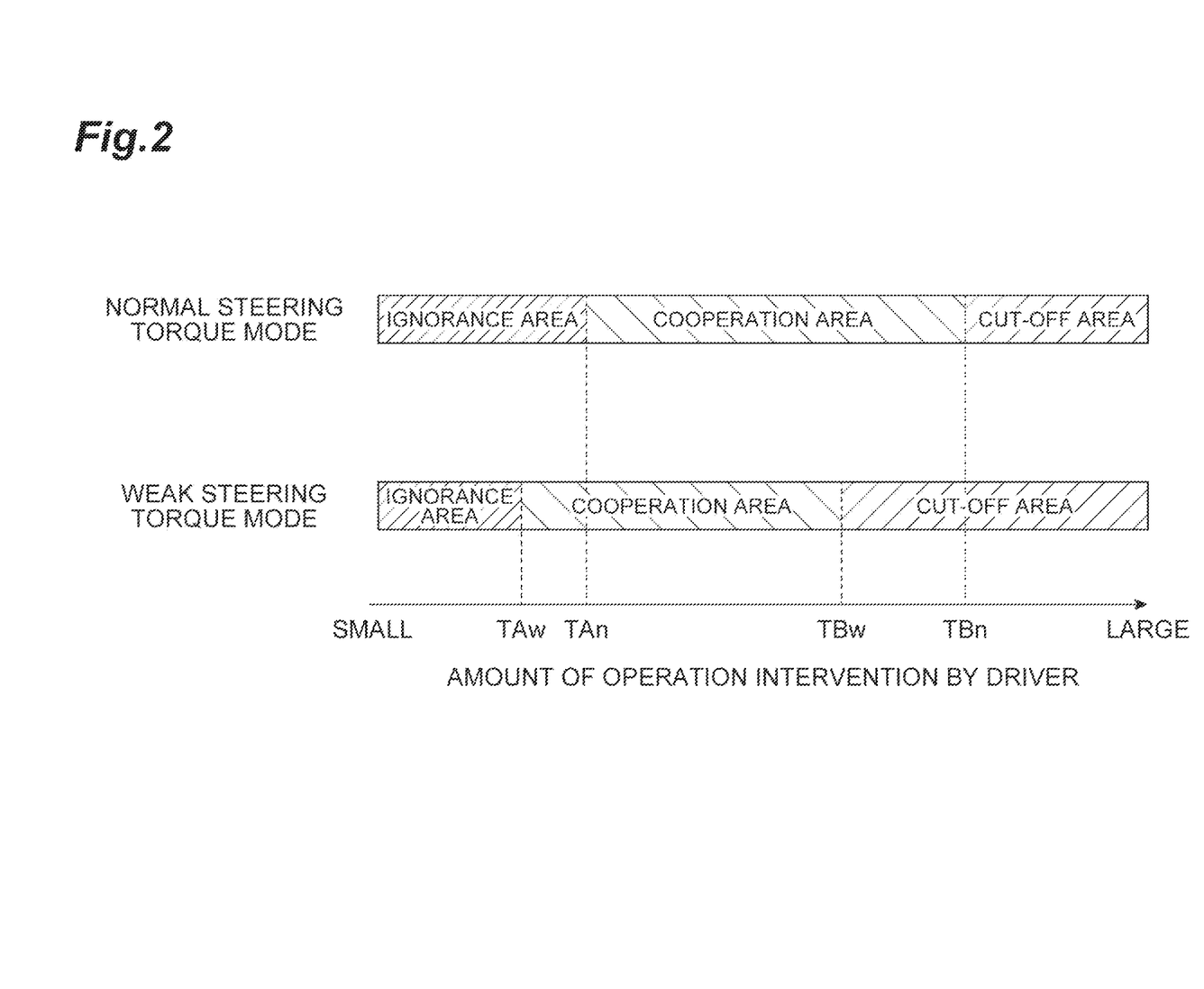
FIG. 2 is a diagram for explaining switching of an area in the autonomous driving system.

FIG. 2 is a diagram for explaining switching of the area in the autonomous driving system. In FIG. 2, the first threshold value in the normal steering torque mode is indicated as $TA_n$, the second threshold value in the normal steering torque mode is indicated as $TB_n$, the first threshold value in the weak steering torque mode is indicated as $TA_W$, and the second threshold value in the weak steering torque mode is indicated as $TB_W$. As illustrated in FIG. 2, the first threshold value $TA_W$ in the weak steering torque mode is smaller than the first threshold value $TA_n$ in the normal steering torque mode. Similarly, the second threshold value $TB_W$ in the weak steering torque mode is smaller than the second threshold value $TB_n$ in the normal steering torque mode.

As illustrated in FIG. 2, the area switching unit 19 switches the area from the ignorance area to the cooperation area, and from the cooperation area to the cut-off area as the amount of operation intervention by the driver during autonomous driving increases. In the weak steering torque mode, the area switching unit 19 switches the area from the ignorance area to the cooperation area in response to a smaller amount of operation intervention than in the normal steering torque mode. Similarly, In the weak steering torque mode, the area switching unit 19 switches the area from the cooperation area to the cut-off area in response to a smaller amount of operation intervention than in the normal steering torque mode.

The vehicle control unit 20 executes the autonomous driving of the vehicle by controlling the traveling of the vehicle. The vehicle control unit 20 performs the autonomous driving of the vehicle based on the position of the vehicle on the map, the map information, the surrounding environment of the vehicle, the travel state of the vehicle, and the travel plan. The vehicle control unit 20 performs the autonomous driving of the vehicle including the lane keep control by transmitting the control signal to the actuator 7.

When the area switching unit 19 switches the area for the autonomous driving from the ignorance area to the cooperation area, the vehicle control unit 20 causes the amount of operation intervention by the driver recognized by the operation intervention recognition unit 15 and the control of the autonomous driving to cooperate with each other to cause the vehicle to travel. When the area switching unit 19 switches the area for the autonomous driving to the cut-off area, the vehicle control unit 20 causes the vehicle to travel along the amount of operation intervention by the driver by transmitting the control signal to the actuator 7 according to the amount of operation intervention by the driver.

Processing by Autonomous Driving System

Next, the processing by the autonomous driving system 100 in the present embodiment will be described with reference to the drawings.

Mode Switching Processing

Figure 3:
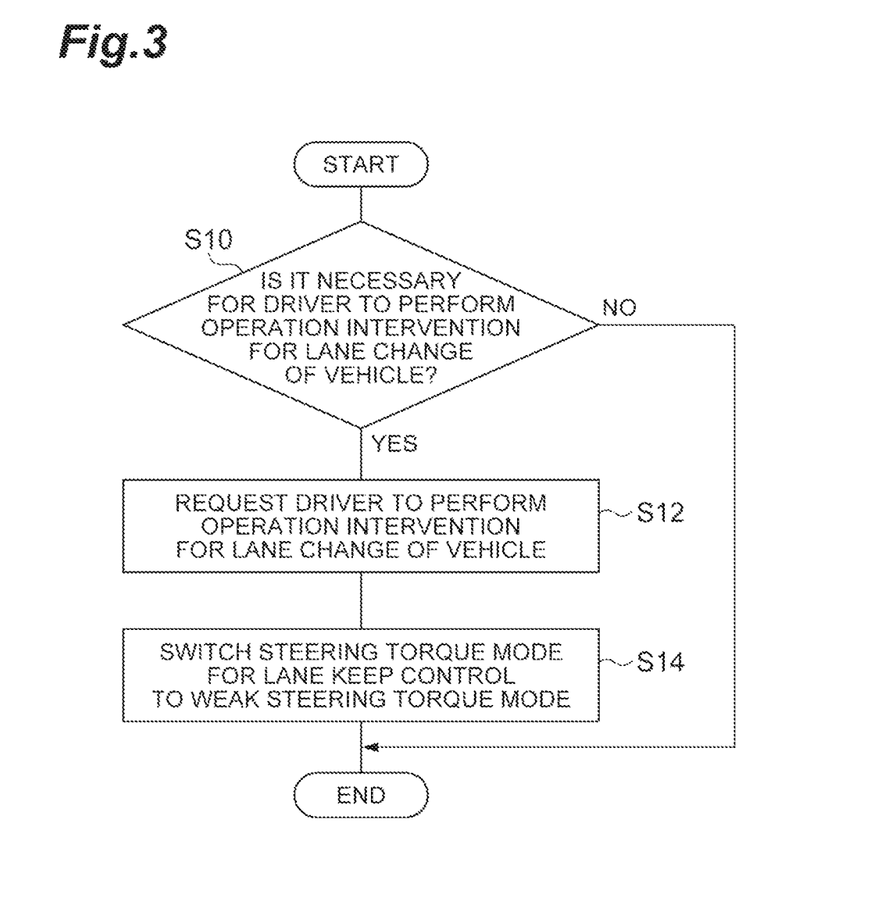
FIG. 3 is a flowchart illustrating steering torque mode switching processing in the autonomous driving system.

FIG. 3 is a flowchart illustrating the steering torque mode switching processing in the autonomous driving system. The mode switching processing is performed during the autonomous driving of the vehicle.

As illustrated in FIG. 3, as S10, the ECU 10 of the autonomous driving system 100 determines the necessity of the operation intervention for the lane change of the vehicle by the driver using the lane change determination unit 16. The lane change determination unit 16 determines the necessity of operation intervention for the lane change of the vehicle by the driver based on, for example, the target route of the vehicle (or the travel plan), the position of the vehicle on the map, and the map information.

If it is determined that it is not necessary for the driver to perform the operation intervention for the lane change of the vehicle (No in S10), The ECU 10 ends the current processing. Thereafter, the ECU 10 repeats the processing from S10 after a certain time elapsed. If it is determined that it is necessary for the driver to perform the operation intervention for the lane change of the vehicle (Yes in S10), the ECU 10 makes the process proceed to S12.

In S12, the ECU 10 requests the driver to perform the operation intervention for the lane change of the vehicle using the lane change request unit 17. The lane change request unit 17 requests the driver to perform the operation intervention for the lane change of the vehicle by transmitting the control signal to the HMI 6 through the sound output or the like. Thereafter, the ECU 10 makes the process proceed to S14.

In S14, the ECU 10 switches the steering torque mode for the lane keep control in the autonomous driving from the normal steering torque mode to the weak steering torque mode using the mode switching unit 18. Thereafter, the ECU 10 ends the current processing.

Area Switching Processing

Figure 4A:
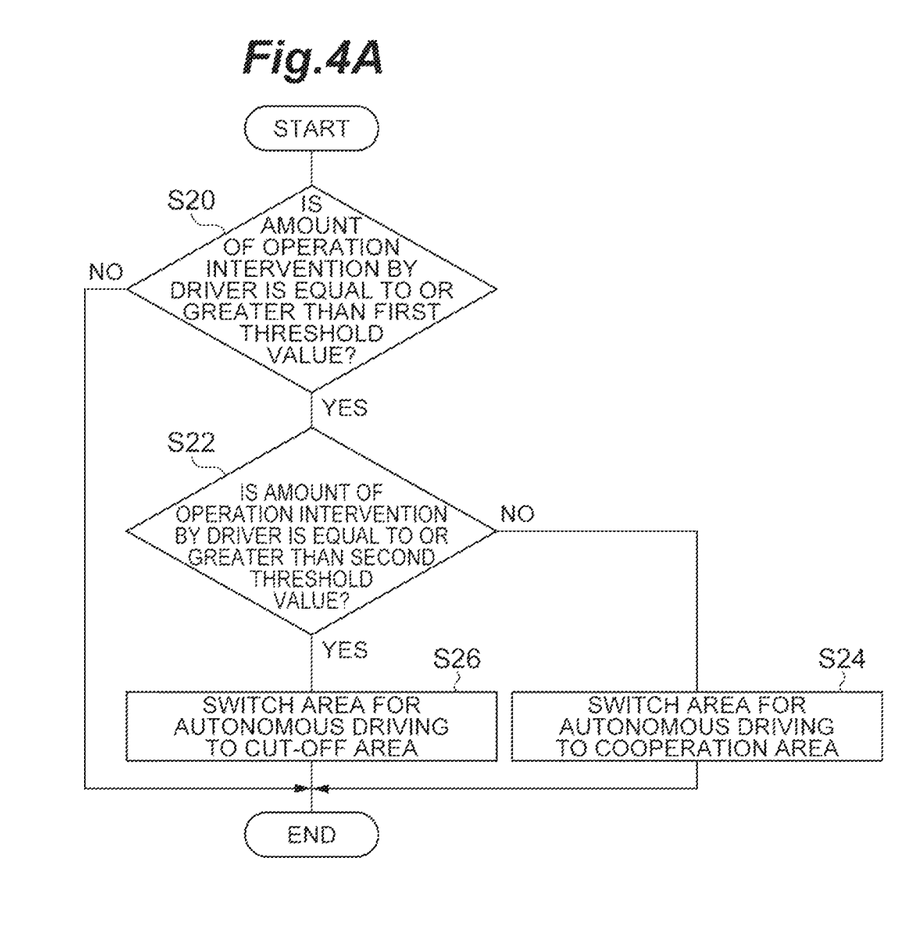
FIG. 4A is a flowchart illustrating area switching processing in the autonomous driving system.

FIG. 4A is a flowchart illustrating the area switching processing in the autonomous driving system 100. The area switching processing is performed when the operation intervention by the driver is recognized by the operation intervention recognition unit 15 during the autonomous driving of the vehicle. Here, the case where the area for the autonomous driving is switched from the ignorance area.

As illustrated in FIG. 4A, as S20, the ECU 10 determines whether or not the amount of operation intervention by the driver is equal to or greater than the first threshold value using the area switching unit 19. If it is not determined that the amount of operation intervention by the driver is equal to or greater than the first threshold value (No in S20), the ECU 10 ends the current processing. Thereafter, the ECU 10 repeats the processing from S20 after certain time elapsed. If it is determined that the amount of operation intervention by the driver is equal to or greater than the first threshold value (Yes in S20), the ECU 10 makes the process proceed to S22.

In S22, the ECU 10 determines whether or not the amount of operation intervention by the driver is equal to or greater than the second threshold value using the area switching unit 19. If it is not determined that the amount of operation intervention by the driver is equal to or greater than the second threshold value (No in S22), the ECU 10 makes the process proceed to S24. If it is determined that the amount of operation intervention by the driver is equal to or greater than the second threshold value (Yes in S22), the ECU 10 makes the process proceed to S26.

In S24, the ECU 10 switches the area for the autonomous driving to the cooperation area using the area switching unit 19. Thereafter, the ECU 10 ends the current processing.

In S26, the ECU 10 switches the area for the autonomous driving to the cut-off area using the area switching unit 19. Thereafter, the ECU 10 ends the current processing.

Threshold Value Switching Processing

Figure 4B:
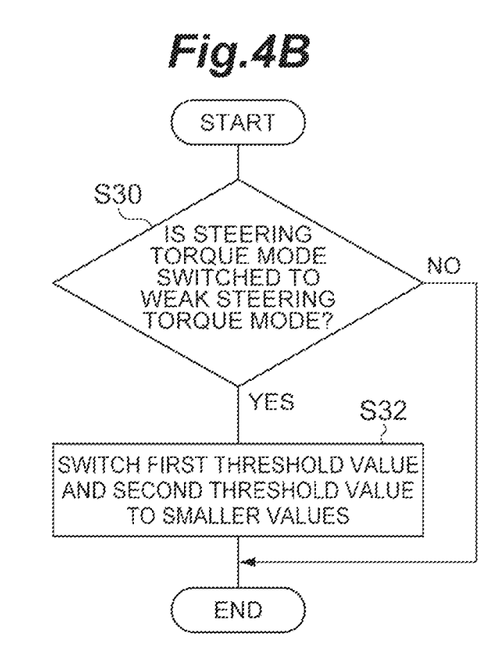
FIG. 4B is a flowchart illustrating threshold value switching processing in the autonomous driving system.

FIG. 4B is a flowchart illustrating the threshold value switching processing in the autonomous driving system. The threshold value switching processing is performed during the autonomous driving of the vehicle.

As illustrated in FIG. 4B, as S30, the ECU 10 determines whether or not the steering torque mode is switched to the weak steering torque mode using the mode switching unit 18. If it is determined that the steering torque mode for the lane keep control in the autonomous driving is not switched to the weak steering torque mode (No in S30), the ECU 10 ends the current processing. Thereafter, the ECU 10 repeats the processing from S30 after certain time elapsed. If it is determined that the steering torque mode for the lane keep control in the autonomous driving is switched to the weak steering torque mode (Yes in S30), the ECU 10 makes the process to proceed to S32.

In S32, the ECU 10 switches the first threshold value and the second threshold value to small values using the area switching unit 19 (refer to FIG. 2). Thereafter, the ECU 10 ends the current processing.

Operational Effects of Autonomous Driving System

According to the autonomous driving system 100 in the present embodiment, if it is determine that it is necessary for the driver to perform the operation intervention for the lane change of the vehicle, the driver is requested to perform the operation intervention for the lane change of the vehicle and the steering torque mode for the lane keep in the control autonomous driving is switched to the weak steering torque mode from the normal steering torque mode. Therefore, in the autonomous driving system 100, if it is determined that it is necessary for the driver to perform the operation intervention for the lane change, since the steering torque for the lane keep control is switched to the weak steering torque mode, it becomes easy for the driver to perform the lane change of the vehicle compared to a case when the steering torque for the lane keep control is maintained as the normal steering torque mode. Therefore, it is possible to appropriately adjust the steering torque for the lane keep control with respect to the operation intervention by the driver for the lane change.

In addition, according to the autonomous driving system 100, in the weak steering torque mode, the steering torque for the lane keep control in the direction of lane change of the vehicle is weakened, and the steering torque in the direction opposite to the direction of lane change is not changed. Therefore, even if the driver mistakenly steers in the direction opposite to the direction of lane change, it is possible to suppress the deviation of the vehicle from the lane by receiving the steering torque for the lane keep control.

Furthermore, according to the autonomous driving system 100, in the weak steering torque mode, since the first threshold value and the second threshold value are switched to small values compared to that in the normal steering torque mode, the area can be switched from the ignorance area to the cooperation area and the cut-off area using less amount of operation intervention by the driver than that when the first threshold value and the second threshold value are not changed, and thus, it is possible to make the lane change of the vehicle easy to be performed by the operation intervention by the driver.

The preferred embodiments of the present disclosure are described above, however, the present disclosure is not limited to the above-described embodiments. In addition to the above-described embodiments, the present disclosure can be embodied in various forms including various modifications and improvements based on the knowledge of those skilled in the art.

For example, in the weak steering torque mode, the steering torque on both the left and right directions of the lane keep control may be weakened compared to that in the normal steering torque mode. Alternatively, in the weak steering torque mode, the steering torque for the lane keep control in the direction of lane change of the vehicle may be weakened compared to that in the normal steering torque mode, and the steering torque in the direction opposite to the direction of lane change may be strengthened compared to that in the normal steering torque mode.

In a case of the weak steering torque mode, the area switching unit 19 may switch only one of the first threshold value and the second threshold value to a smaller value than that in the case of the normal steering torque mode rather than switching both the first threshold value and the second threshold value. In addition, in a case of the weak steering torque mode, the area switching unit 19 does not necessarily need to change the first threshold value and/or the second threshold value compared to the normal steering torque mode.

The autonomous driving system 100 does not necessarily need to include the area switching unit 19. That is, the autonomous driving system 100 does not necessarily need to switch the area between the ignorance area, cooperation area, and the cut-off area. When the operation intervention is performed by the driver, the autonomous driving system 100 may preferentially reflect the operation intervention by the driver to the traveling of the vehicle regardless of the amount of operation intervention.

What is claimed is:

1. An autonomous driving system configured to perform an autonomous driving of a vehicle, comprising:
   a vehicle speed sensor that detects a vehicle speed; and
   an electronic control unit (ECU) including a processor programmed to:
   control the autonomous driving of the vehicle;
   while controlling the autonomous driving, determine that it is necessary for the driver to perform an operation intervention for a lane change of the vehicle when a length of a lane changeable section for the vehicle is shorter than a distance sufficient for the lane change by the autonomous driving, wherein the lane changeable section for the vehicle is a section where a traveling lane of the vehicle and a lane of a lane change destination are adjacent to each other, and wherein the distance sufficient for the lane change by the autonomous driving is changed according to the vehicle speed of the vehicle;
   request the driver to perform the operation intervention for the lane change of the vehicle when the determination is made that it is necessary to perform the operation intervention for the lane change of the vehicle by the driver;
   switch a steering torque mode for a lane keep control in the autonomous driving from a normal steering torque mode to a weak steering torque mode when the driver is requested to perform the operation intervention for the lane change of the vehicle,
   if an amount of operation intervention by the driver becomes equal to or greater than a first threshold value, cause the vehicle to travel under a cooperation between the operation intervention by the driver and the lane keep control in the autonomous driving, and if the amount of operation intervention by the driver is equal to or greater than a second threshold value, which is greater than the first threshold value, cause the vehicle to travel by the operation intervention by the driver without reflecting the lane keep control of the autonomous driving, and
   wherein the first threshold value and the second threshold value are switched to smaller values in the weak steering torque mode than that in the normal steering torque mode,
   wherein the weak steering torque mode is a mode of the lane keep control that (i) weakens, compared to that in the normal steering torque mode, a steering torque in a direction of the lane change of the vehicle among a right direction and a left direction of the vehicle, and (ii) strengthens, compared to that in the normal steering torque mode, a steering torque in a direction opposite to the direction of lane change.

2. An autonomous driving method executed by at least one processor for performing autonomous driving of a vehicle, the method comprising:
   controlling the autonomous driving of the vehicle;
   while controlling the autonomous driving, determining that it is necessary for the driver to perform an operation intervention for a lane change of the vehicle when a length of a lane changeable section for the vehicle is shorter than a distance sufficient for the lane change by the autonomous driving, wherein the lane changeable section for the vehicle is a section where a traveling lane of the vehicle and a lane of a lane change destination are adjacent to each other, and wherein the distance sufficient for the lane change by the autonomous driving is changed according to the vehicle speed of the vehicle;
   requesting the driver to perform the operation intervention for the lane change of the vehicle when the determination is made that it is necessary to perform the operation intervention for the lane change of the vehicle by the driver;
   switching a steering torque mode for a lane keep control in the autonomous driving from a normal steering torque mode to a weak steering torque mode when the driver is requested to perform the operation intervention for the lane change of the vehicle,
   if an amount of operation intervention by the driver becomes equal to or greater than a first threshold value, causing the vehicle to travel under a cooperation between the operation intervention by the driver and the lane keep control in the autonomous driving, and if the amount of operation intervention by the driver is equal to or greater than a second threshold value, which is greater than the first threshold value, causing the vehicle to travel by the operation intervention by the driver without reflecting the lane keep control of the autonomous driving, and
   wherein the first threshold value and the second threshold value are switched to smaller values in the weak steering torque mode than that in the normal steering torque mode,
   wherein the weak steering torque mode is a mode of the lane keep control that (i) weakens, compared to that in the normal steering torque mode, a steering torque in a direction of the lane change of the vehicle among a right direction and a left direction of the vehicle, and (ii) strengthens, compared to that in the normal steering torque mode, a steering torque in a direction opposite to the direction of lane change.

* * * * *